United States Patent Office 3,594,294
Patented July 20, 1971

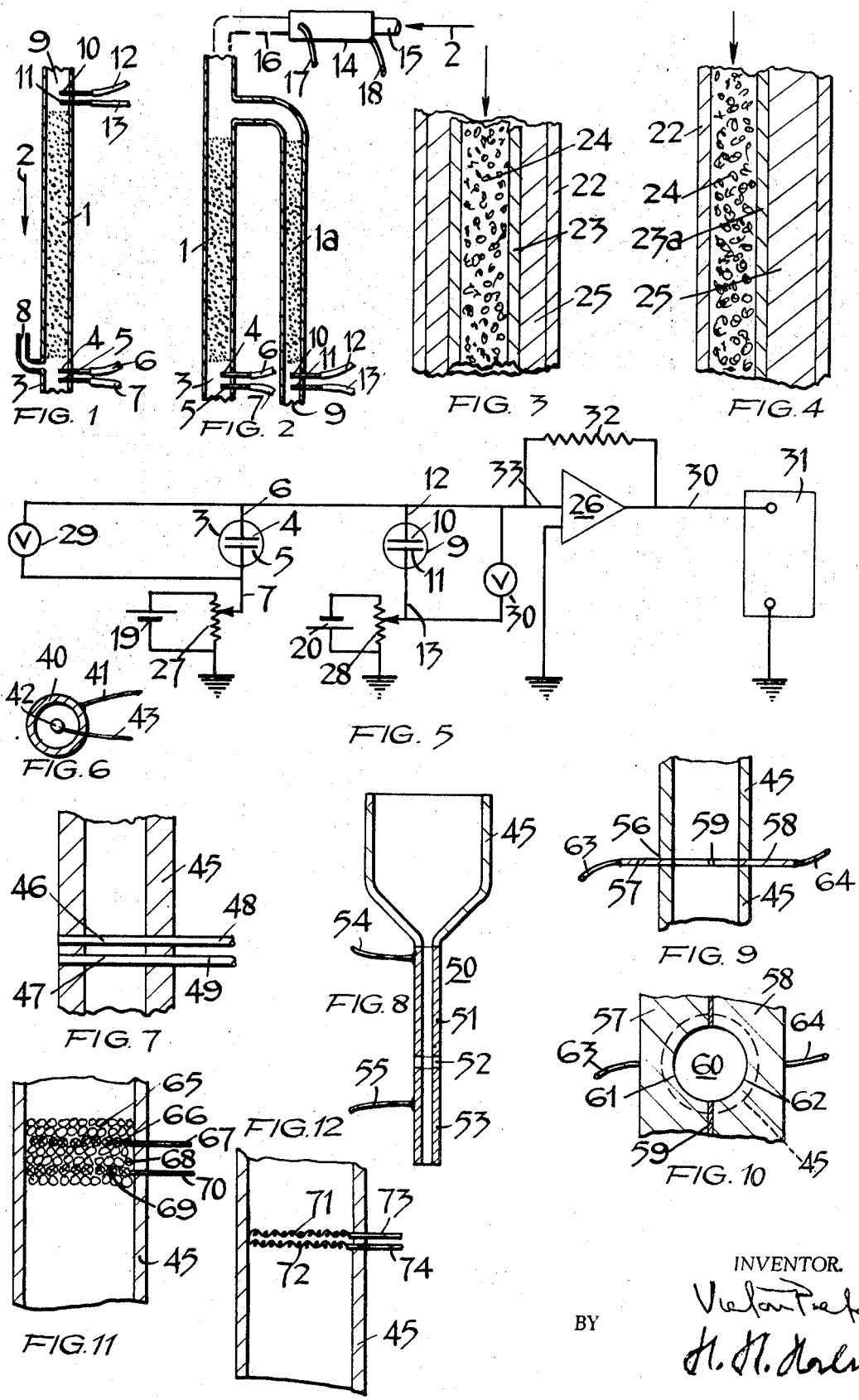

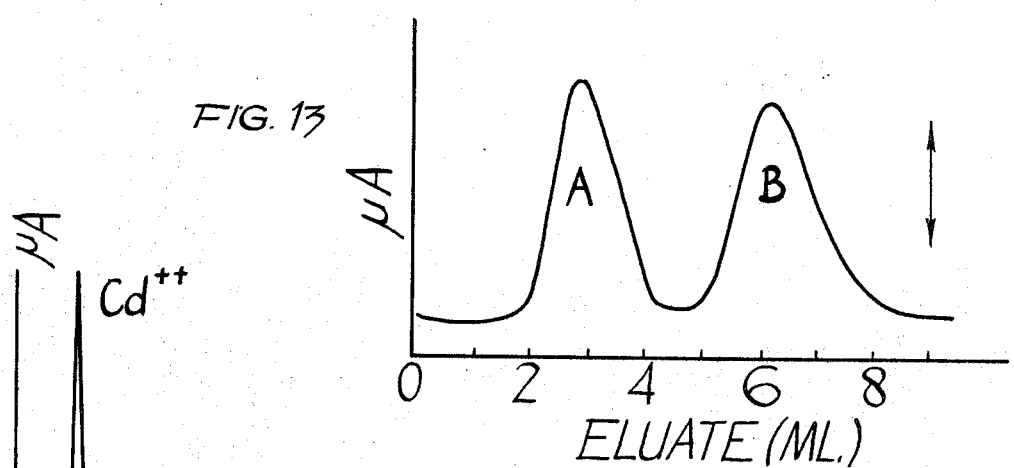
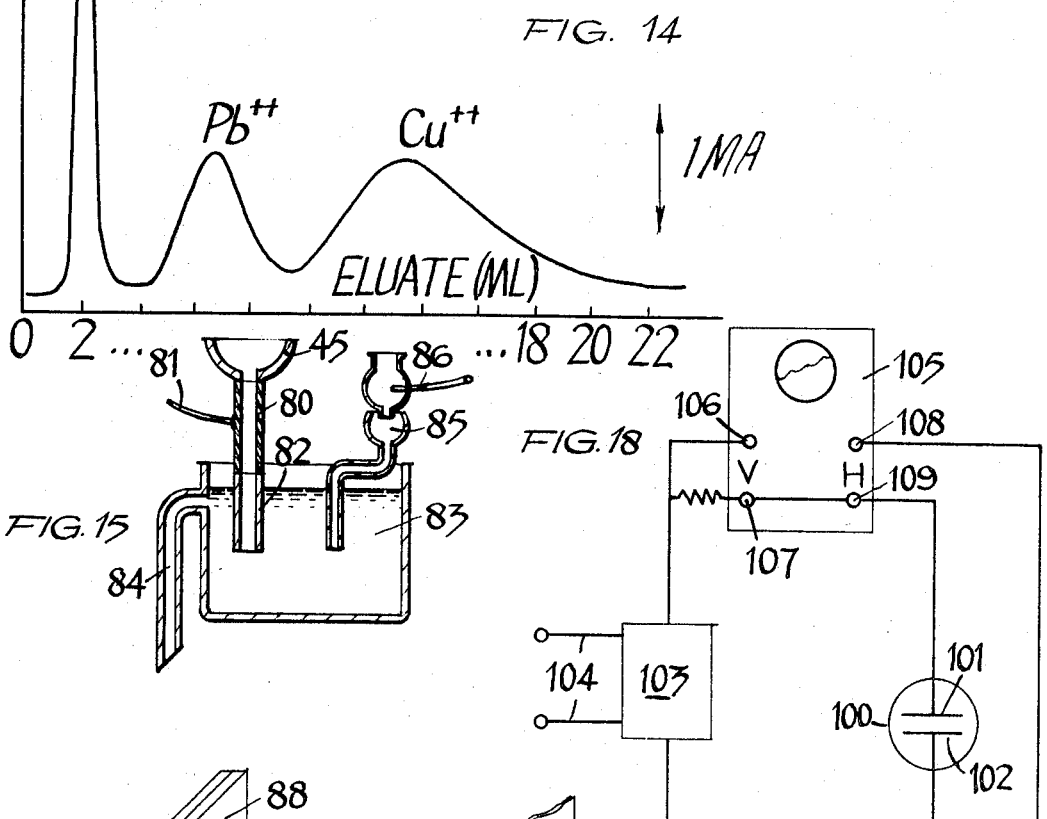
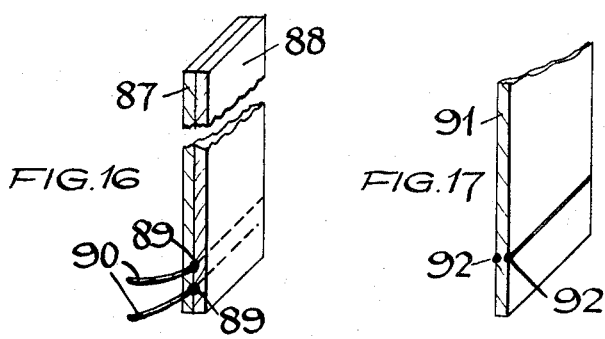

3,594,294
DETECTION METHOD AND APPARATUS FOR CHROMATOGRAPHY
Victor Pretorius and Hans Helmut Hahn, both of 38 Marais St., Bailey's Muckleneuk, Pretoria, Transvaal, Republic of South Africa
Filed Oct. 3, 1966, Ser. No. 583,788
Claims priority, application Republic of South Africa, Oct. 6, 1965, 65/5,409; Aug. 2, 1966, 66/4,568
Int. Cl. B01k 5/00
U.S. Cl. 204—180G        23 Claims

ABSTRACT OF THE DISCLOSURE

For purposes of detecting changes in an eluate in chromatography a cell comprising a solid detection electrode and a reference electrode is connected in series with a chromatographic separating system, the detection electrode being in direct flowing contact with the eluate and a liquid (which may be the eluate itself). A controlled potential difference is applied to the electrodes to bring about a chemical oxidation/reduction reaction of the substances being separated and the relationship between at least two quantities inter-related by Ohm's law is observed. Provision is made for a compensatory cell and for the electro-chemical removal from the eluant of impurities which interfere with the detection. A preferred cell is tubular with the electrodes e.g. of graphite or glassy carbon provided by the walls of the cell or extending across the cell.

---

The present invention relates to a detection method and apparatus, more particularly for monitoring or measuring at least one of the variables of constitution and concentration of a chromatographic eluate.

Various detecting methods and means are known in chromatography, and for the purposes of the present invention only some of the more sophisticated earlier proposals are relevant and primarily those relating to liquid chromatography.

Of these methods differential refractometry is expensive and insensitive. Heat adsorption and desorption is also expensive, relatively insensitive and results in double peaks which is inconvenient. Spectrometric detection is insensitive and again very expensive. Recently an ultrasonic method has been proposed which is bound to be expensive, its other practical limitations being as yet unknown. Finally a dropping mercury electrode method may be mentioned which has been proposed but which is inherently inconvenient to employ, suffers from large time constants and involves large dead volumes in the equipment.

The invention, although not to be limited by the folowing, is in principle capable of the attainment of a number of important advantages. Extremely high sensitivities are attainable. Although it is possible to elaborate on the equipment where such is desired, the basic equipment is simple and can be made at low cost. The method and means are exceptionally versatile, being capable of responding to a vast variety of solutes in practically all solvents normally employed in liquid chromatography. Whilst the invention is not limited to micro-chromatography it lends itself excellently to that purpose because it can do with exceptionally small dead volumes. In a very large number of applications, notably in ionised systems, the responsiveness is very fast rendering the invention suitable for use in modern high speed separations.

The method in accordance with the invention comprises passing the said eluate, as it emerges from a chromatographic separation process, in contact with a solid detection electrode and a reference electrode, maintaining an electrical potental across said electrodes controlled to a value adapted for an electrolytic oxidation/reduction change to take place of the substance in said fluid of which said variable is to be monitored, and measuring the relationship between at least two members of the group of quantities inter-related by Ohm's law, i.g. of current, potential and resistance, whilst the fluid passes in contact with the electrodes.

The detection apparatus in accordance with the invention comprises a cell comprising a solid detection electrode and a reference electrode, the cell being adapted to be connected in series with and following onto a chromatographic separating device, means for controlling the potential across the electrodes of the cell, means for measuring the relationship between at least two members of the group of quantities interrelated by Ohm's law, i.e. of current, potential and resistance, and terminals adapted to be connected to a source of electric power for maintaining said potential.

The electrodes are preferably fixed.

In principle the new method and apparatus are applicable to the concentration measuring or detecting of all substances in chromatographic eluates capable of electrolytical oxidation or reduction.

The invention is at present considered to find its widest application in liquid chromatography which will therefore be emphasised in the following description. Yet it is considered that the method may also be adapted to following the progress of a gas chromatographic separation process. In some cases it may be possible to measure concentration or constitutional changes in the gases direct. In most cases it will be necessary to carry out the method in the presence of a liquid, preferably an electrolyte, e.g. a film of liquid applied to the electrodes. For example, a film of liquid e.g. water may be caused to run over the electrodes continuously, more particularly at a constant rate.

Alternatively, the gaseous eluate may be caused to bubble through a cell filled with liquid. For this purpose an electrode similar in construction to a gas electrode may be employed.

It is also possible to pass the eluate co-currently with a constant continuous stream of liquid through the detector cell.

The liquid may include a solubilizing agent for the components of the gas the concentration of which is to be monitored e.g. a substance or substances capable of forming soluble complexes or salts with such components.

Also, in the following description, the application of the invention to elution chromatography carried out in columns will be emphasised, although the invention is not to be considered limited thereby in any way.

The invention is applicable in principle also to paper chromatography in which case the paper may be placed in contact with, e.g. clamped between two thin edged electrodes or in which the paper may be marked with conductive lines, e.g. of graphite to serve as the electrodes. Detection electrodes may also be incorporated in the plates used in thin layer chromatography.

The invention may also be applied to starch or gel (agar) chromatography (electrophoresis).

Further aspects and details of the invention will be described in the following, largely by way of example, with reference to the accompanying drawings, in which FIG. 1 represents a chromatographic column including the detection means in accordance with the invention.

FIG. 2 represents a view similar to FIG. 1 in an alternative arrangement and including eluent cleaning means.

FIGS. 3 and 4 represent two embodiments of an eluent purifying device in broken away section for use in combination with the detection means in accordance with the invention.

FIG. 5 represents a wiring diagram of a preferred embodiment in accordance with the invention.

FIG. 6 represents a section transverse to the direction of flow through a detection cell in accordance with the invention.

FIGS. 7 to 9, 11 and 12 represent sections to different embodiments of detection cells in accordance with the invention taken parallel to the direction of flow.

FIG. 10 represents a section transverse to the section in accordance with FIG. 9.

FIGS. 13 and 14 represent two typical chromatograms recorded by the method in accordance with the invention.

FIG. 15 represents yet another vertical section through another embodiment of a detection cell in accordance with the invention.

FIG. 16 represents a thin layer chromatographic plate for thin layer chromatography modified in accordance with the invention.

FIG. 17 represents an edge on view of a strip of chromatographic paper modified in accordance with the invention and FIG. 18 illustrates diagrammatically the oscillographic monitoring of eluates in accordance with the invention.

Referring to FIG. 1 a chromatographic column is represented by 1, the direction of bow being indicated by arrow 2. In accordance with the invention a detection cell 3 is provided at the outlet side of the column, having two electrodes 4 and 5 with terminals 6 and 7. Various constructions of cells will be described further below. When a suitable potential is applied across terminals 6 and 7 electrochemical oxidation or reduction will take place of any suitable solute contained in the eluate from the chromatographic columns substantially in accordance with the principles of polarography and electrochemistry. The concentration of any supporting electrolyte if used is usually chosen to be at least 10 to 100 times the concentration of the solute being monitored. For example, where the solute has a concentration of $10^{-7}$ to $10^{-8}$ molar the corresponding concentration of supporting electrolytes will be $10^{-5}$ to $10^{-6}$ M. Typical supporting electrolytes are inorganic salts such as potassium chloride or lithium nitrite or organic slats such as tetraethyl or methyl ammonium halide, e.g. chloride, bromide or iodide. In the low concentrations in which the supporting electrolyte is usually employed it is sufficiently soluble in virtually all typical solvents employed as chromatographic eluents including aromatic hydrocarbon solvents such as benzene and toluene; pyridine; water; lower alcohols such as ethanol or methanol; carbon tetrachloride, chloroform; aliphatic hydrocarbons such as pentane, hexane, heptane or octane; dioxane and others. Where the solubility for the supporting electrolyte is inadequate and also in order to ensure ionisation slight moistening of the solvent with water may be resorted to.

In the majority of cases, the supporting electrolyte may be incorporated in the eluent before it enters the chromatographic column or equivalent chromatographic separating device. However, for cases in which such is not desired, the invention provided for an inlet 8 between the end of column 1 and the electrodes of the detector cell 3 through which inlet supporting electrolyte solution may be introduced into the eluate.

At present the potential sensitivity of the method and apparatus is estimated to be in the vicinity of $10^{-14}$ mole per litre. The limiting factor at present is mainly electric noise in the system, the noise level in a single detecting cell being of the order of $10^{-9}$ ampere. A substantial part of this noise may be eliminated by coupling the detector cell 3 to a compensating cell 9 having electrodes 10 and 11 with terminals 12 and 13 respectively and being substantially similar to cell 3. Two potential manners of coupling in the system are envisaged. In FIG. 1 the compensating cell precedes the inlet end of column 1. In that manner the compensating cell is subject to substantially the same fluctuations in flow velocity and associated sources of electric noise as the detector cell 3.

Another arrangement is shown in FIG. 2 in which a dummy column 1a is provided having substantially similar flow characteristics to the separating column 1 and in which the compensating cell occupies a position equivalent to the position of cell 3 relative to column 1.

FIG. 2 also illustrates the installation of an eluent purifying device 14 having an inlet end 15 and an outlet end 16 connected to the inlet end of columns 1, 1a and terminals 17 and 18. Across the terminals a predetermined potential is applied, e.g. tapped off from a potentiometer designed to remove all impurities which might interfere with the chromatogram or the readings taken from detector 3. In addition, the eluent even before it enters the purifying device is first freed of oxygen in a manner known per se, e.g. by bubbling nitrogen through the eluent.

One embodiment of the purifier is illustrated in FIG. 3 comprising a tubular outside wall 22, in concentrical relationship thereto a porous sinterglass tube 23 containing an electrically conductive liquid pervious packing, e.g. tin shot, glassy carbon powder, silver plated plastic foam, in electrical contact with one of the terminals 17, 18 in FIG. 2 and a reference electrode, of which the electrode material, e.g. calomel or silver chloride fills space 25. The reference electrode is connected to the other of terminals 17, 18. The porous tube 23 is impregnated with agar, saturated with an electrolyte compatible with the reference electrode.

The embodiment in accordance with FIG. 4 differs from that in accordance with FIG. 3 by the substitution for porous tube 23 of a porous partition 23a, similarly impregnaed with electrolyte saturated agar, and dividing the tube 22 into two parallel passages, one containing the reference electrode, the other the conductive packing 24. A suitable partition may be made out of the porous plates (e.g. sintered synthetic resin) employed in accumulators as electrode spacers.

Referring now to FIG. 5 the terminal 7 of cell 3 is used to tap off the desired potential of a potentiometer 27 connected across a battery 19 which voltage is measured with a volt meter 29. Similarly terminal 13 is fed with the desired voltage for compensating cell 9 from potentiometer 28 connected across a battery 20. The voltage tapped off is measured with voltmeter 30. Potentiometers 27 and 28 each have one terminal carthed. Terminals 6 and 12 of cells 3 and 9 are connected to one input terminal of an operational amplifier 26, the other input terminal of which is earthed. A suitable operational amplifier is, for example, the commercial model Philbrick P 65 AU (Philbrick Associates, Boston, Mass.). The output terminal 30 of the amplifier is connected to one input terminal of a recorder 31, the other terminal of which is earthed. A feedback resistance, 32 e.g. 10K is connected across from the input terminal 33 of the operational amplifier to the output terminal 30. The cells 3 and 9 are so coupled that the differential current of the two cells is recorded.

The distance between the two cells 3 and 9 in the chromatographic system must not be less than a certain minimum which depends on the conductivtiy of the system and the eluent in particular. The total resistance between the two cells must be high enough not to affect appreciably the measured current. For example, where the detection current is $10^{-8}$ ampere with an applied voltage of 2 volts, the resistance must be such that the internal current is not more than about one tenth the measured current. Therefore, the internal resistance between the cells should be about $10^9$ ohms. at least. The internal resistance depends, of course, on the geometry of the system and the electrolyte concentration. If the column packing itself does not contribute to the conductivity and assuming a typical KCl concentration of $10^{-3}$ M. the minimum distance between the cells will be 50 centimetres for a column diameter of 3 mm.

It will be realised, of course, that the provision of compensating cell 9 is a refinement which in some cases may be dispensed with.

Referring now to FIG. 6 the detector cell shown is tubular, the walls 40 of the tube being of a suitable conductive material with a terminal 41 connected thereto, adapted to act as one of the electrodes. The other electrode 42 with terminal 43 takes the form of a wire concentrically arranged relative to the cell walls.

In the selection of the design of a cell for a particular chromatographic system, the cell's contribution to the total plate height is an important consideration. The total plate height is composed of plate height contributions derived from the separating system itself, the inlet, the outlet and the detection cell. According to very recent developments plate heights of the order of as little as $10^{-3}$ cms. are feasible in micro analytical systems and accordingly it is to be endeavoured for the contribution to plate height of the detector cell not to exceed this order of magnitude. In the following will be shown how this may be achieved with various cell constructions.

Referring to FIG. 7 the column wall is shown as 45. The detector cell forms a direct continuation of the packed portion of the column (packing not shown). The detector electrode 46 is represented by a thin rod or wire projecting across the inside of the column. In order to achieve the desired low plate height contribution its thickness is chosen to be of the order of $10^{-3}$ cms. The dimensions of the reference electrode 47, which could be of similar construction, are not as critical. However, the two electrodes should be as closely together as possible to keep the internal resistance to an absolute minimum for maximum sensitivity of the cell. It will be realised that as a result the terminals 48 and 49 also come to be very close together creating some potential insulation problems. Fluorinated hydrocarbon polymer such as polychlorotrifluoroethylene or polytetrafluoroethylene have been found satisfactory insulators for the purpose.

Referring now to FIG. 8, the column walls proper are again indicated as 45 tapering towards a much narrower portion 50 representing the detector cell. This narrow portion consists of a conductive capillary 51 followed by a very short insulating capillary 52 which in turn is followed by a second conductive piece of capillary 53. Capillary 51 with its terminal 54 serves as the detector electrode and capillary 53 serves as the reference electrode, being provided with a terminal 55. The length of the reference electrode is not critical. The length of insulating portion 52 is again chosen as short as possible, whilst the length in terms of cm. of the capillary 51 is so selected that it does not exceed $10^{-3}$ times the ratio of the square of the column diameter to the square of the capillary inner diameter, in order to satisfy the requirement of a small contribution to total plate height. For example for a column diameter of 2 mm. and a capillary diameter of 0.2 mm., the length of the detector electrode will be 1 mm.

Referring to FIGS. 9 and 10 the outlet end of column 45 has been neatly cut across at 56 and reassembled e.g. with a synthetic resin adhesive such as epoxy resin after insertion between the two pipe ends of a composite disc composed of two conductive half-discs 57 and 58 joined end to end by an intermediate strip of insulating material 59. After completion of the assembly a hole 60 is drilled through the composite disc to restore a continuous tubular passage, part of the walls of which is formed by the exposed edges 61 and 62 of the half-discs 57 and 58. Each half-disc is provided with a terminal 63 and 64 respectively to complete the cell in which half-discs 57 and 58 now perform the functions of the detector and reference electrode respectively. The preferred thickness of disc 57, 58 is once again $10^{-3}$ cms.

Referring now to FIG. 11, yet another manner of providing a detector cell is to render parts of the column packing conductive. Thus the main column packing 65 is non-conductive followed by a thin layer 66 of conductive particles in contact with a terminal 67, this in turn being followed by a thin layer 68 of non-conductive packing, followed in turn by a layer 69 of conductive packing in contact with a terminal 70 and representing the reference electrode. The particles have, for example, a diameter of $10^{-3}$ cms. This embodiment is very suitable also for providing monitoring means inside a chromatographic separating system as well, and not necessarily only at the inlet or outlet ends thereof.

Referring to FIG. 12, the detector and reference electrodes are represented by two parallel closely spaced very fine wire gauze grids 71, 72 spanned across the inside of column walls 45, each having terminals 73 and 74 respectively. The spacing of the wire gauze grids depends on the internal resistance and may for example be of the order of between 0.1 and 3 mm.

The electrodes may be made of any material (or materials) which is conducting and does not interfere with the measurement of the data relating to the oxidation/reduction process. Examples of electrode materials are platinum, copper, gold, nickel, graphite, including pyrolised graphite.

If the discharge of hydrogen and oxygen is to be suppressed, e.g. in aqueous solutions, an electrode material showing large overvoltages for such reactions is useful, e.g., copper. In some cases amalgamated platinum may be used, particularly for the anode. A particularly advantageous electrode material suitable for both the anode and the cathode has been found to be glassy carbon.

Regarding the reference electrode numerous further variations are possible, for example the employment of a standard calomel or silver chloride electrode, as will be described further below with reference to FIG. 15.

Where a layer of conductive particles is employed as an electrode as in FIG. 11, such particles may, for example, consist of or comprise metal powders or carbon powders, in particular graphite powders, glassy carbon or powders of synthetic or natural resins containing a conductive filler, e.g. metal or graphite.

FIG. 13 represents a typical chromatogram recorded on an automatic recorder connected to a detector cell in accordance with the invention. It represents the separation of Acid Bordeaux and F.C.F. Brilliant Blue on Silica Gel H; eluting agent: 6% ethanol and $4 \times 10^{-3}$ M KCl; detection by Cu (cathodic)—and Pt (anodic)—electrodes; appl. pot.=1.8 v. 10 cm. column x 5 mm. Each substance was employed in an amount of $2 \times 10^{-8}$ mols. Peak A represents acid Bordeaux and peak B F.C.F. Brilliant Blue.

FIG. 14 illustrates a similar chromatogram of the separation of $Cd^{++}$, $10^{-7}$ moles $Pb^{++}$ $8 \times 10^{-8}$ moles and $Cu^{++}$ $2 \times 10^{-7}$ moles on Amberlite I.R. 120. Eluting agent: 1.0 M KCl (pH 5). Detection by Pt (Hg)—amalgam (cathodic)—graphite (anodic). appl. pot=1.9 v. column 8 cm. x 4 mm. 10 µl. sample.

Both afore-described chromatograms took approximately 10 minutes to complete.

FIG. 15 illustrates an alternative method of putting the invention into practice. The column 45 has a capillary outlet of which the top portion 80 is conductive, connected to a terminal 81 and serves as the detector electrode followed by a piece of insulating capillary 82 which latter dips into an open-topped vessel 83 having an overflow 84, whilst the reference electrode is formed by a calomel electrode 85 with a terminal 86, also dipping into vessel 83.

The invention is also applicable to thin layer chromatography as shown in FIG. 16, illustrating a chromatographic plate having a base 87 with a conventional chromatographic thin layer 88 applied thereto. Near one end of the plate two fine grooves 89 have been cut or etched into the base 87 to accommodate each a fine line of conductive material, e.g. a metal wire, each having a terminal 90, the two wires serving as the detector and the reference electrode respectively.

This arrangement is very similar to that in accordance with FIG. 17, where a strip of chromatographic paper 91 is shown having to each side thereof applied a fine line of conductive material, e.g. graphite transverse to the direction of development when the paper is used in chromatography. The paper will, in use, be clamped, e.g. near the edge, between two terminals, each in contact with one of the lines 92.

Where the internal resistance of the system is very high, e.g. where the solvent is substantially nonpolar (e.g. benzene) with but a trace of electrolyte if necessary, the same electronics may be employed for the detectors as for a conventional flame detector as used in gas chromatography.

In some cases, the method may be further improved by passing the eluate between the electrodes under turbulent conditions, thereby to decrease the diffusion layer and increase sensitivity. This may be achieved by the maintenance of high flow rate, and/or by adapting the cross-section of the cell to induce turbulence. Electrodes may also be employed specifically shaped to induce turbulence.

The electrodes or the entire cell may be subjected to oscillation, e.g. ultrasonic vibrations for the same purpose.

The method is particularly suitable for use with chromatographic processes in which the separation itself takes place under turbulent conditions of the moving phase as described in our pending application Ser. No. 548,900 filed May 10, 1966.

The process may also be applied to the monitoring of continuous chromatographic processes in order to observe the maintenance of separating efficiency.

In all cases it is possible to employ several pairs of electrodes in succession, maintained at different potentials for the simultaneous measurements of the concentrations of different substances.

Proferably the value of the current across the electrodes is registered continuously, thereby to obtain an easily readable chromatogram.

The method may be carried out with direct current. The voltage setting across the electrodes may be employed to provide qualitative information concerning the nature of the substance the concentration of which is being monitored.

If desired or required, the polarity of the electrodes may be reversed from time to time in order to prevent the accumulation of deposits on the electrodes.

It is also possible to employ alternating currents in the method, in which case the output of the detector may be observed on the screen of an oscillograph for simultaneous qualitative readings.

This is diagrammatically shown in FIG. 18 in which the detector cell is represented by 100 comprising electrodes 101 and 102. The alternating current generator is diagrammatically shown as 103 having input terminals 104 adapted to be connected to the mains or to a battery. The oscilloscope 105 has terminals 106 and 107 for the vertical component of the oscillogram and terminals 108 and 109 for the horizontal component. It is, of course, possible in principle to provide circuitry for the side by side continuous recording of the vertical and the horizontal component of the signal. Sine wave or square wave alternating current may be employed.

What we claim is:

1. As part of a chromatographic separating process a detection method for monitoring at least one of the variables of constitution and concentration of a chromatographic eluate which method comprises: providing in the flow path of a chromatographic separating system a cell comprising a solid detection electrode and a reference electrode; wetting said electrodes by maintaining a stream of liquid containing a supporting electrolyte in contact therewith and being in direct flowing contact with at least the solid detector electrode surface; passing the said eluate, after having been subjected to chromatographic separation, in contact with said wetted electrodes; maintaining an electrical potential across said electrodes controlled to a value adapted for an electrochemical oxidation/reduction change to take place of the substance in said eluate of which said variable is to be monitored, and measuring the relationship between at least two members of the group of quantities of current, potential and resistance, whilst the eluate passes in contact with the electrodes.

2. A method as claimed in claim 1 which comprises measuring the current at a preset potential.

3. A method as claimed in claim 1 in which the eluate is a liquid and serves itself as the liquid wetting the electrodes.

4. A method as claimed in claim 3 in which organic substances in said liquid are monitored.

5. A method as claimed in claim 1 in which the eluate passing the solid detector electrode is maintained in a turbulent condition.

6. A method as claimed in claim 1 in combination with the step of passing an eluent prior to entering the separating system, in contact with an electrode through a passage, bordered by a salt bridge leading to a reference electrode and applying a potential difference to the electrode and reference electrode thereby removing from the eluent impurities detectable in the detection method.

7. A process as claimed in claim 1 wherein the supporting electrolyte is fed as an independent stream into the eluate.

8. A detection apparatus connected to a chromatographic separating apparatus and adapted to be used for monitoring at least one of the variables of constitution and concentration of a chromatographic eluate which detection apparatus comprises a cell comprising a solid detection electrode and a reference electrode adapted to be exposed to the eluate, an inlet and an outlet for conducting a flow of said eluate through the cell, means for maintaining a D.C. electrical potential across the electrodes, means to incrementally adjust said D.C. potential to a value adapted for an electrolytic oxidation/reduction change to take place of the substance in said eluate to be monitored, and means for measuring the relationship between at least two members of the group of current, potential, and resistance.

9. A detection apparatus as claimed in claim 8 in which the cell takes the form of a tubular body having an inlet for the eluate at one end and an outlet at the opposite end.

10. A detection apparatus as claimed in claim 9 in which one electrode of the cell is formed by the inside of the wall of the cell, the second electrode being in concentric relationship to said first mentioned electrode.

11. A detection apparatus as claimed in claim 9 in which each electrode forms a portion of the wall of the cell, said portions being interconnected by an insulating portion of the wall of the cell.

12. A detection apparatus as claimed in claim 11 in which the electrodes are formed by passages having graphite walls.

13. A detection apparatus as claimed in claim 9 in which the electrodes take the form of a pair of wire gauze grids across the tube, insulated against one another, each grid constituting one electrode.

14. A detection apparatus as claimed in claim 13 in which the grids have an amalgamated surface.

15. A detection apparatus as claimed in claim 8 in which at least one of the electrodes consists of glassy carbon.

16. A detection apparatus as claimed in claim 8 in which the one electrode is a length of a conducting tubing followed by a length of insulating tubing dipping into a vessel having an overflow and containing the second electrode.

17. A detection apparatus as claimed in claim 8 in which said cell is coupled to a second essentially similar compensatory cell.

18. A detection apparatus as claimed in claim 8 connected to the outlet end of a chromatographic separating device, the inlet end of which is preceded by an eluent cleaning device comprising a passage for the eluent containing one electrode, said passage being bordered at least in part by a partition permeable to the impurities, the pores of said partition being filled with a suitable medium comprising a supporting electrolyte acting as a salt bridge followed by a second electrode and means being provided adapted to apply a potential difference to the pair of electrodes for removing interfering impurities from the eluent.

19. A detection apparatus as claimed in claim 8 in which said cell is coupled to a second essentially similar compensatory cell.

20. A detection apparatus as claimed in claim 19 connected to the outlet end of a chromatographic separating device, the inlet end of which is preceded by an eluent cleaning device comprising a passage for the eluent containing one electrode, said passage being bordered at least in part by a partition permeable to the impurities, the pores of said partition being filled with a suitable medium comprising a supporting electrolyte acting as a salt bridge followed by a second electrode and means being provided adapted to apply a potential difference to the pair of electrodes for removing interfering impurities from the eluent.

21. A detection apparatus as claimed in claim 8, said cell comprising structural means for permitting said detection electrode to directly contact flowing eluate.

22. A detection apparatus as claimed in claim 8, said cell comprising structural means for permitting said detection electrode to directly contact flowing eluate.

23. An apparatus as claimed in claim 8, comprising a separate inlet into the cell for liquid containing a supporting electrolyte.

References Cited

UNITED STATES PATENTS

| | | | |
|---|---|---|---|
| 3,346,479 | 10/1967 | Natelson | 204—301 |
| 3,375,187 | 3/1968 | Buchler | 204—301 |
| 3,384,564 | 5/1968 | Ornstein et al. | 204—180 |
| 3,257,609 | 6/1966 | Sanford et al. | 73—23.1 |
| 3,342,558 | 9/1967 | Reinecke | 204—1.1 |
| 3,399,972 | 9/1968 | Skeggs et al. | 23—230 |
| 3,156,631 | 11/1964 | Seyl | 204—195 |
| 3,346,479 | 10/1967 | Natelson. | |
| 3,375,187 | 3/1968 | Buchler. | |
| 3,384,564 | 5/1968 | Ornstein et al. | |

OTHER REFERENCES

Hampel, "Encyl. of Electrochem.," QD553E5C.2, Reinhold Pub. Corp. (1964), pp. 229–236.

Helffrich, "Ion Exchange," McGraw-Hill (1962), pp. 493–498.

Gilwood, "Ion-Exchange Endpoint," Instr. and Automation, October 1954, p. 1633.

JOHN H. MACK, Primary Examiner

A. C. PRESCOTT, Assistant Examiner

U.S. Cl. X.R.

204—1, 195, 299